US008676866B2

(12) United States Patent
Lemcke et al.

(10) Patent No.: US 8,676,866 B2
(45) Date of Patent: Mar. 18, 2014

(54) COMPUTING CANONICAL HIERARCHICAL SCHEMAS

(75) Inventors: Jens Lemcke, Karlsruhe (DE); Michael Dietrich, Karlsruhe (DE); Gunther Stuhec, Heidelberg (DE)

(73) Assignee: SAP AG, Walldorf (DE)

( * ) Notice: Subject to any disclaimer, the term of this patent is extended or adjusted under 35 U.S.C. 154(b) by 159 days.

(21) Appl. No.: 13/423,471

(22) Filed: Mar. 19, 2012

(65) Prior Publication Data

US 2013/0246480 A1    Sep. 19, 2013

(51) Int. Cl.
*G06F 7/00* (2006.01)

(52) U.S. Cl.
USPC ........... 707/808; 707/705; 707/687; 707/797; 707/798; 705/35; 705/37

(58) Field of Classification Search
USPC ............ 707/705, 687, 797, 798, 808; 705/35, 705/37
See application file for complete search history.

(56) References Cited

U.S. PATENT DOCUMENTS

| | | | |
|---|---|---|---|
| 6,826,568 B2 * | 11/2004 | Bernstein et al. | 707/749 |
| 7,543,266 B2 * | 6/2009 | Brown, Jr. | 716/101 |
| 7,920,992 B2 | 4/2011 | Rutenbar et al. | |
| 2004/0111358 A1 | 6/2004 | Lange et al. | |
| 2004/0133439 A1 | 7/2004 | Neotzold et al. | |
| 2004/0225629 A1 | 11/2004 | Eder | |
| 2005/0025342 A1 | 2/2005 | Lee et al. | |
| 2005/0027645 A1 | 2/2005 | Lui | |
| 2006/0184473 A1 | 8/2006 | Eder | |
| 2008/0256069 A1 | 10/2008 | Eder | |
| 2009/0182774 A1 | 7/2009 | Krig | |
| 2011/0081955 A1 | 4/2011 | Lange et al. | |
| 2012/0022995 A1 | 1/2012 | Lange | |
| 2012/0066194 A1 | 3/2012 | Eisenreich | |

OTHER PUBLICATIONS

P. Agrawal et al., Trio: A System for Data, Uncertainty, and Lineage, In VLDB '06: Proceedings of the 32nd International Conference on Very Large Data Bases, pp. 1151-1154. VLDB Endowment, Sep. 2006.

H. Arnold, Dependence Modelling Via the Copula Method, CSIRO Mathematical and Information Services, Technical report, Feb. 2006, retrieved from http://www.cmis.csiro.au/techreports/docs/x00001cd.pdf. 33 pages.

D. Behan et al., "A procedure for simulation with constructed copulas," retrieved from www.soa.org/files/pdf/rsrch-final-instr-copula.pdf, accessed Jun. 7, 2010, 13 pages.

(Continued)

*Primary Examiner* — Cheyne D Ly
(74) *Attorney, Agent, or Firm* — Fish & Richardson P.C.

(57) ABSTRACT

Methods, systems, and computer-readable storage media for receiving a plurality of source hierarchical schemas, processing the source hierarchical schemas to generate a merged graph, which is comprising a plurality of merged nodes, each merged node being provided based on one or more nodes from at least two of the source hierarchical schemas, determining and resolving using conflicts in the merged graph to generate a conflict-free merged graph, wherein resolving comprises splitting one or more merged nodes into respective sub-sets of merged nodes, defining and processing a constraints satisfaction problem (CSP) to generate a plurality of mediated hierarchical schemas (MHSs), each MHS being a solution to the CSP, identifying an MHS of the plurality of MHSs as an optimum MHS, wherein a canonical hierarchical schema (CHS) is provided as the optimum MHS, and storing the CHS as a computer-readable document in a computer-readable memory.

20 Claims, 8 Drawing Sheets

(56) References Cited

OTHER PUBLICATIONS

O. Benjelloun et al., "Databases with Uncertainty and Lineage," The VLDB Journal—The International Journal on Very Large Data Bases, vol. 17, issue 2, pp. 243-264, Mar. 2008.

R. Cheng et al., "Efficient join processing over uncertain data," In CIKM '06: Proceedings of the 15th ACM international conference on Information and knowledge management, pp. 738-747, New York, NY, Nov. 2006.

J. Huang et al., "A Probabilistic Database Management System," In SIGMOD '09: Proceedings of the 35th SIGMOD international conference on Management of data, pp. 1071-1074, New York, NY, Jun. 29-Jul. 2, 2009.

Y. Ioannidis, "The history of histograms (abridged)," In Proceedings of the 29th International Conference on Very Large Data Bases (VLDB), Sep. 2003, Berlin, Germany, 12 pages.

R. Jampani et al., "MCDB: A Monte Carlo Approach to Managing Uncertain Data," In SIGMOD '08: Proceedings of the 2008 ACM SIGMOD international conference on Management of data, pp. 687-700, New York, NY, Jun. 9-12, 2008.

T. Kroll, "Copula Based Risk Aggregation," retrieved from www.azarmi.org/wp-content/.../copula-based-risk-aggregation.pdf, Dec. 2, 2009, 21 pages.

V. Ljosa et al., "Indexing arbitrary probability distributions," In Data Engineering, 2007, ICDE 2007, IEEE 23rd International Conference on Tools with Artificial Intelligence, pp. 946-955, Nov. 7-9, 2007.

Mathworks, "Simulation of dependent random variables using copulas," retrieved from www.mathworks.com/products/demos/statistics/copulademo.html, 2010, accessed Jul. 6, 2010, 16 pages.

Viswanath Poosala et al., "Improved Histograms for Selectivity Estimation of Range Predicates," Proceedings of the 1996 ACM SIGMOD International Conference on Management of Data (SIGMOD '96), Montreal, Quebec, Canada, Jun. 4-6, 1996, pp. 294-305.

Anish Das Sarma et al., "Exploiting lineage for confidence computation in uncertain and probabilistic databases," Proceedings of the 2008 IEEE 24th International Conference on Data Engineering, pp. 1023-1032, Apr. 2008, Washington, DC.

Prithviraj Sen et al., "Representing and querying correlated tuples in probabilistic databases," In Data Engineering, 2007, ICDE 2007, 23rd IEEE International Conference on Tools with Artificial Intelligence, Nov. 7-9, 2011, Boca Raton, Florida, pp. 596-605.

Sarvjeet Singh et al., "Orion 2.0: Native Support for Uncertain Data," In SIGMOD '08: Proceedings of the 2008 ACM SIGMOD, pp. 1239-1242, Jun. 9-12, 2008, Vancouver, BC, Canada.

Claudio Romano, "Applying Copula Function to Risk Management," Apr. 2002, 25 pages.

Embrechts, P., et al., "Modelling Dependence with Copulas and Applications to Risk Management," Handbook of Heavy Tailed Distributions in Finance, Sep. 10, 2001, 50 pages.

IBM Corporation, "DB2 Version 9.1 for z/OS: SQL Reference," http://publib.boulder.ibm.com/infocenter/dzichelp/v2r2/index.jsp?topic=%2Fcom.ibm.db2z9.doc.sqlref%2Fsrc%2Ftpc%2Fdb2z_bif_correlation.htm, Dec. 2011, 2173 pages.

I. Kojadinovic et al., "Modeling Multivariate Distributions with Continuous Margins Using the copula R Package," In Journal of Statistical Software, May 2010, vol. 34, Issue 9, pp. 1-20.

Oracle, "Database QL Reference," http://docs.oracle.com/cd/B19306_01/server.102/b14200/functions028.htm, Dec. 2005, 1428 pages.

Prithviraj Sen et al., "PrDB: Managing and Exploiting Rich Correlations in Probabilistic Database," The International Journal on Very Large Data Bases, vol. 18, Issue 5, Oct. 2009, pp. 1065-1090.

C. Sirangelo, "Approximate Query Answering on Multi-dimensional Data," PhD Thesis, University of Calabria, Oct. 21, 2005, 168 pages.

IBM Corporation, "SPSS Statistics Base 20—Chapter 12: Bivariate Correlations," 2011, retrieved from <ftp://public.dhe.ibm.com/software/analytics/spss/documentation/statistics/20.0/en/client/Manuals/IBM_SPSS_Statistics_Base.pdf>, 328 pages.

IBM Corporation, "SPSS Advanced Statistics 20—Chapter 2: GLM Multivariate Analysis," 2011, retrieved from <ftp://public.dhe.ibm.com/software/analytics/spss/documentation/statistics/20.0/en/client/Manuals/IBM_SPSS_Advanced_Statistics.pdf>, 184 pages.

VoseSoftware, ModelRisk 4—Empirical Copula, retrived from <http://vosesoftware.com/ModelRiskHelp/index.htm#Help_on_ModelRisk/Copulas/Copulas_in_ModelRisk.htm>, 2007, 575 pages.

Jens Lemcke etl al., "Computing a Canonical Hierarchical Schema," Enterprise Interoperability V Proceedings of the I-ESA Conferences, vol. 5, Aug. 2012, pp. 305-315.

Kastner und Saia, "The Composite Applications Benchmark Report," Aberden Group, Dec. 2006, 25 pages.

Gartner Inc., Technology Research [Online], http://www.gartner.com/technology/home.jsp. [Accessed: Sep. 30, 2011].

D. Beneventano et al., "*The MOMIS approach to Information Integration*," International Conference on Enterprise Information Systems (ICEIS 2001), Setúbal, Portugal, Jul. 7-10, 2001, pp. 194-198.

K. Saleem et al., "PORSCHE: Performance ORiented SCHEma mediation," *Information Systems*, vol. 33, Issue 7-8, Nov. 2008, pp. 637-657.

C. Delobel et al., "Semantic integration in Xyleme: a uniform tree-based approach," *Data & Knowledge Engineering*, vol. 44, No. 3, pp. 267-298, Mar. 2003.

R.D.S. Mello et al., "BInXS: A Process for Integration of XML Schemata," 17th International Conference on Advanced Information Systems Engineering (CAiSE 2005), Porto, Portugal, Jun. 13-17, 2005, Lecture Notes in Computer Science, vol. 3520, pp. 151-166.

Liaison Technologies, "Working with Canonicals: Using Contivo to Bring Canonicals/COMs/CIMs to Life," White Paper, Integration and Data Management, 2010, 16 pages.

Crossgate AG, Crossgate: EDI Managed Services, E-Invoicing, SAP PI, Supply Chain Analytics [Online], http://www.crossgate.de/. [Accessed: Sep. 29, 2011].

J. Madhavan et al., "Generic Schema Matching with Cupid," Proceedings of the 27th VLDB Conference, Roma Italy, Sep. 2001, pp. 49-58.

* cited by examiner

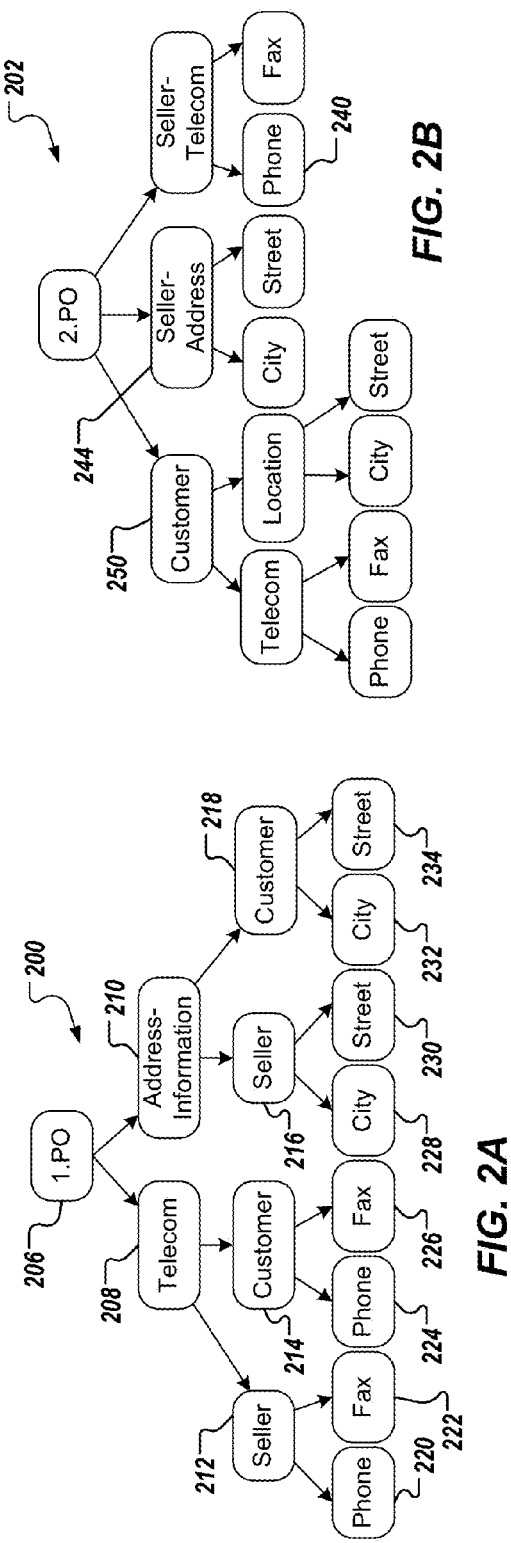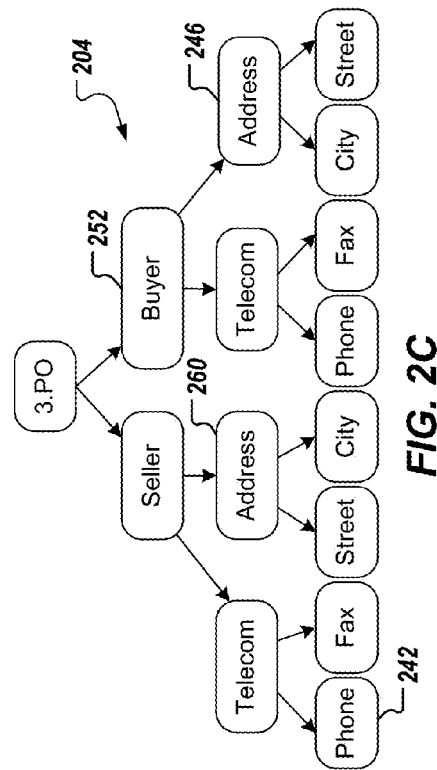
FIG. 2B
FIG. 2C
FIG. 2A

COMPUTING CANONICAL HIERARCHICAL SCHEMAS

BACKGROUND

An enterprise can include multiple business processes that are embodied in respective information technology (IT) applications. In some instances, the applications include diverse business data interfaces, schemas and data models with respect to one another. Application integration can include the integration of systems and applications across an enterprise. The diversity and heterogeneity of business data interfaces, schemas and data models across the integrated applications is one of the key drivers of integration costs, making up a significant portion of IT budgets of enterprises.

SUMMARY

Implementations of the present disclosure include computer-implemented methods for providing a canonical hierarchical schema (CHS) based on a plurality of source hierarchical schemas. In some implementations, methods include the actions of receiving the plurality of source hierarchical schemas, each source hierarchical schema being stored as a computer-readable document in computer-readable memory, processing the source hierarchical schemas to generate a merged graph, the merged graph including a plurality of merged nodes, each merged node being provided based on one or more nodes from at least two of the source hierarchical schemas, determining that the merged graph includes one or more conflicts and, in response, resolving each conflict of the one or more conflicts to generate a conflict-free merged graph, wherein resolving includes splitting one or more merged nodes into respective sub-sets of merged nodes, defining a constraints satisfaction problem (CSP) that includes a plurality of constraints associated therewith based on the conflict-free merged graph, processing the CSP to generate a plurality of mediated hierarchical schemas (MHSs), each MHS being a solution to the CSP, identifying an MHS of the plurality of MHSs as an optimum MHS, wherein the CHS is provided as the optimum MHS and storing the CHS as a computer-readable document in the computer-readable memory.

In some implementations, a plurality of field mappings and a plurality of semantic correspondences can be received. Each field mapping and semantic correspondence can be associated with a set of source hierarchical schemas, wherein the merged graph is generated based on the plurality of field mappings and the plurality of semantic correspondences.

In some implementations, splitting the one or more merged nodes into respective sub-sets of merged nodes includes, for each merged node of the one or more merged nodes, generating a reduced graph comprising a plurality of maximal cliques.

In some implementations, each maximal clique includes nodes that can be merged without creating a conflict.

In some implementations, the plurality of constraints define the removal of exclusive edges from the conflict-free merged graph to provide an MHS, exclusive edges being identified based on leaf nodes of the conflict-free merged graph.

In some implementations, the plurality of constraints include a maximum occurrence constraint, the maximum occurrence constraint providing that a child node can have only one parent node.

In some implementations, the plurality of constraints include a maximum occurrence constraint, the maximum occurrence constraint providing that edges that eventually reach the same leaf are exclusive.

In some implementations, the plurality of constraints include at least one connectivity constraint that ensures that full paths provided in the hierarchical schemas are preserved in the plurality of MHSs.

In some implementations, for each non-leaf merged node of the conflict-free merged graph a number of actual uses, a number of potential uses, a frequency based on the number of actual uses and the number of potential uses and a relevant frequency based on the frequency can be determined.

In some implementations, the number of actual uses and the number of potential uses are determined based on a plurality of field mappings, each field mapping being associated with a set of source hierarchical schemas.

In some implementations, the relevant frequency is determined based on a frequency threshold.

In some implementations, for each MHS of the plurality of MHSs, determining a floating point variable to provide a plurality of floating point variables.

In some implementations, the floating point variable is provided as a sum of relevant frequencies associated with each merged node that is present in the MHS.

In some implementations, identifying an MHS of the plurality of MHSs as an optimum MHS comprises identifying a maximum floating point variable from the plurality of floating point variables, the optimum MHS being having the maximum floating point variable.

In some implementations, the merged graph is a cyclic graph.

In some implementations, the conflict-free merged graph is an acyclic graph.

In some implementations, the conflict-free merged graph includes a non-tree structure.

In some implementations, each MHS includes a tree structure.

In some implementations, the CHS includes a tree structure.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 2A-2C depict respective example hierarchical schemas.

Like reference symbols in the various drawings indicate like elements.

DETAILED DESCRIPTION

Implementations of the present disclosure are generally directed to generating a canonical data model, including a canonical hierarchical schema (CHS), from a set of disparate, hierarchical schemas. In some examples, a canonical data model provides a pattern for enterprise application integration. In some implementations, a merged graph is generated based on the plurality of hierarchical schemas in the set of hierarchical schemas, and any conflicts within the merged graph are resolved to generate a conflict-free merged graph. Multiple mediated hierarchical schemas (MHSs) are generated based on the conflict-free merged graph. The CHS is determined based on the plurality of MHSs. In some examples, the CHS can be used to integrate a plurality of applications, each application corresponding to a hierarchical schema in the plurality of hierarchical schemas.

Figure 1:
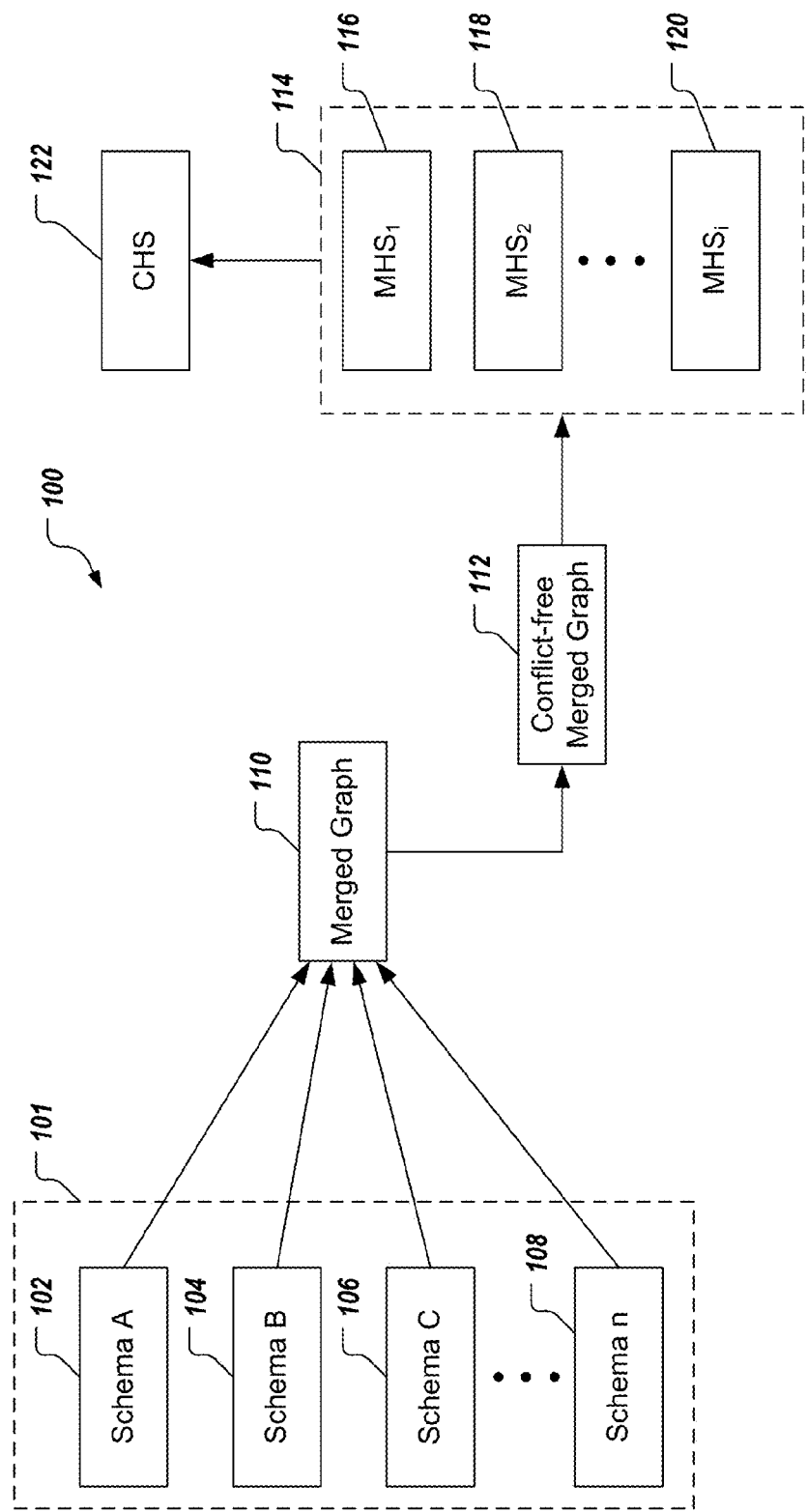
FIG. 1 is a functional block diagram depicting example processes for generating a canonical hierarchical schema (CHS).

FIG. 1 is a functional block diagram depicting example processes for generating a CHS. A set of hierarchical schemas 101 includes a plurality of hierarchical schemas. In the depicted example, the hierarchical schemas include Schema A, Schema B, Schema C, . . . Schema n (102, 104, 106, 108, respectively). In some examples, each schema is specific to a particular computer program application that is executed using one or more processors, and is different from the other hierarchical schemas in the set of hierarchical schemas 101. In some examples, each of the hierarchical schemas 102, 104, 106, 108 can be provided as a document that can be stored in computer-readable memory. Example documents can include documents provided using schema description languages. Example schema description languages can include XSD (XML Schema Definition), DTD (document type definition), DSD (Document Structure Description), XDR (XML-Data Reduced (XDR)) and others.

The set of hierarchical schemas 101 is processed to generate a merged graph 110. In some examples, the merged graph 110 can be provided as a non-tree structure, cyclic graph and can include conflicts between the hierarchical schemas. The merged graph 110 and/or portions thereof can be processed to resolve any conflicts and to generate a conflict-free merged graph 112. In some examples, the conflict-free merged graph 112 can be provided as a non-tree structure, acyclic graph. The conflict-free merged graph 112 is processed to generate a set of MHSs 114. In some examples, a set of MHSs can include one or more MHSs. In the depicted example, the set of MHSs 114 includes $MHS_1$, $MHS_2$, . . . , $MHS_i$, (116, 118, 120, respectively). The set of MHSs 114 is processed to provide a CHS 122.

Implementations of the present disclosure will be discussed in further detail below with reference to FIG. 1.

FIGS. 2A-2C depict respective example hierarchical schemas 200, 202, 204. By way of non-limiting example, the hierarchical schemas 200, 202, 204 correspond to information that can be provided in a purchase order (PO). Each of the hierarchical schemas 200, 202, 204 defines the organization of information contained in a PO.

Each of the hierarchical schemas 200, 202, 204 is provided as a tree structure that includes nodes and edges between nodes. In some examples, the nodes of a hierarchical schema include a root node, intermediate nodes and leaf nodes. Using the hierarchical schema 200 as a non-limiting example, the hierarchical schema 200 includes a root node 206, intermediate nodes 208, 201, 212, 214, 216, 218 and leaf nodes 220, 222, 224, 226, 228, 230, 232, 234. In some examples, root nodes and intermediate nodes include labels, and leaf nodes include fields having data therein. In a hierarchical schema having a tree structure, nodes can include parent nodes and children nodes, where each parent node includes one or more child nodes (as indicated by edges between nodes) and each child node includes only one parent node (as indicated by an edge between nodes). Again using the hierarchical schema as an example, the intermediate node 212 is the parent node of the leaf nodes 220, 222 (i.e., child nodes), and the intermediate node 208 is the parent node of the intermediate nodes 212, 214 (i.e., child nodes). In this manner, a root node is a parent node, an intermediate node can be both a parent node and a child node, and a leaf node can be a child node if the tree is not malformed, i.e. consists of more than a single node.

In view of the discussion above, a hierarchical schema is provided as a tree of properties P, where each hierarchical schema can be spanned by a partial function (e.g., parent; $P \rightarrow P$) that provides the parent to each property. The set of all leaf nodes/properties is a subset of the set of all nodes/properties (e.g., $L \subset P$). In some examples, multiple schemas can appear in a graph spanned by the function parent as unique connected components. The undirected reachability relation of the graph can be provided as an equivalence relation S, where two properties belonging to the same schema can be denoted as $p_1 \sim s p_2$ (e.g., instead of $(p_1, p_2) \in S$) (where the operator "~" denotes an equivalence relationship). The set of all nodes belonging to the same schema as the property $p_1$ can be denoted as $S_1 = [p_1]$, where $S_1$ denotes a specific hierarchical schema. The set of all schemas can be denoted as $P/\sim$. We can add a subscript as in $\sim_s$, $[p_1]_s$, and $p/\sim_s$ to distinguish the equivalence operator, the equivalence class, and the set of all equivalence classes belonging to equivalence relation S from other equivalence relations.

In accordance with implementations of the present disclosure, field mappings and semantic correspondences between nodes across multiple schemas can be provided. In some examples, field mappings indicate a correspondence between leaf nodes across multiple schemas and semantic correspondences indicate a correspondence between intermediate nodes across the multiple schemas. In some examples, the provided field mappings are a subset of all tuples that can be generated from the leaf nodes of the hierarchical schemas and can be denoted as $M \subset L \times L$. In some examples, the provided semantic correspondences can be denoted as $C \subset P\backslash L \times P\backslash L$ (where the operator "\" denotes "without"). The distinction between field mappings and semantic correspondences is logical because a field (i.e., a leaf node) carries a value whereas an intermediate node structures fields, and is realistic because a field mapping translates only field values to field values.

In some examples, the field mappings are provided as two-way field mappings. Referring again to FIGS. 2A-2C, and by way of non-limiting example, a first field mapping between the hierarchical schemas 200, 202 and a second field mapping between the hierarchical schemas 200, 204 can be provided. The first field mapping can define two-way correspondences between the leaf nodes of the hierarchical schema 200 and the leaf nodes of the hierarchical schema 202. For example, the leaf node 220 of the hierarchical schema 200 can correspond to a leaf node 240 of the hierarchical schema 202, and the leaf node 240 of the hierarchical schema 202 can correspond to the leaf node 220 of the hierarchical schema 200. The second field mapping can define two-way correspondences between leaf nodes of the hierarchical schema 200 and leaf nodes of the hierarchical schema 204. For example, the leaf node 220 of the hierarchical schema 200 can correspond to a leaf node 242 of the hierarchical schema 204, and the leaf node 242 of the hierarchical schema 204 can correspond to the leaf node 220 of the hierarchical schema 200.

In some examples, the semantic correspondences are provided as two-way semantic correspondences. Referring again to FIGS. 2A-2C, and by way of non-limiting example, a first semantic correspondence between the hierarchical schemas 200, 202 and a second semantic correspondence between the hierarchical schemas 200, 204 can be provided. The first semantic correspondence can define two-way correspondences between the intermediate nodes of the hierarchical schema 200 and the intermediate nodes of the hierarchical schema 202. The second semantic correspondence can define two-way correspondences between intermediate nodes of the hierarchical schema 200 and intermediate nodes of the hierarchical schema 204. For example, the intermediate node 210 of the hierarchical schema 200 can correspond to an intermediate node 246 of the hierarchical schema 204, and the intermediate node 246 of the hierarchical schema 204 can correspond to the intermediate node 210 of the hierarchical schema 200.

As discussed in further detail herein, generation of the CHS is based on merging of the hierarchical schemas in view of the provided field mappings and semantic correspondences. During the merging process, nodes of the multiple hierarchical schemas are merged to provide merged nodes. In some examples, a merged node is provided as an equivalence class of corresponding properties and can be denoted as $X \subset P$. An equivalence relation can be derived and can be denoted as $E \subset P \times P$. The equivalence relation can completely contain the field mappings M and the semantic correspondences C, as well as tuples to establish reflexivity, symmetry and transitivity. Accordingly, a merged graph can be provided and can include merged nodes and edges between the merged nodes.

Figure 3:
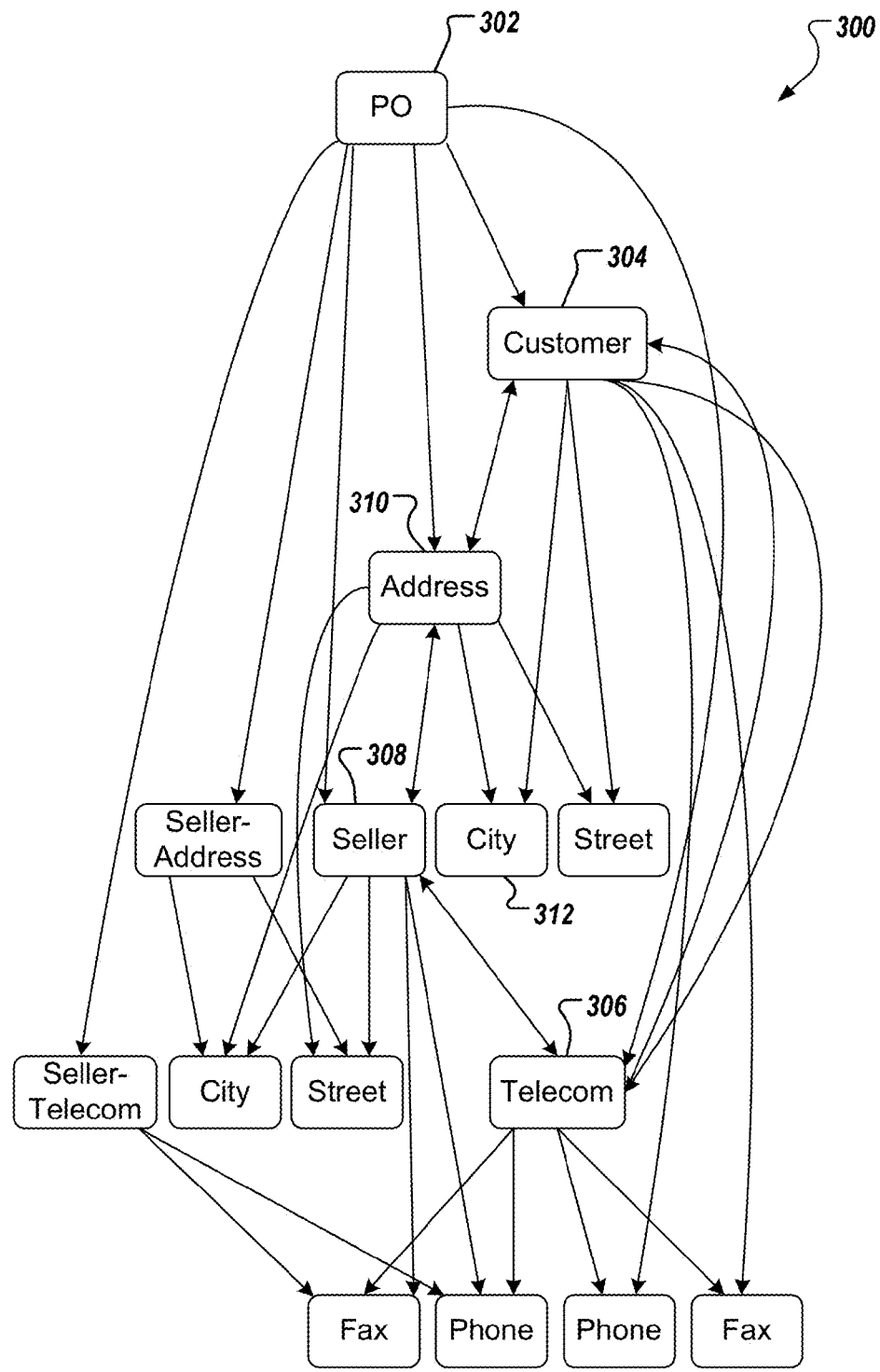
FIG. 3 depicts an example merged graph based on the example hierarchical schemas of FIGS. 2A-2C.

FIG. 3 depicts an example merged graph 300 based on the example hierarchical schemas 200, 202, 204 of FIGS. 2A-2C. Each node in the merged graph 300 is provided as a merged node and thus, an equivalence class. In generating the merged graph 300, an edge is provided between a pair of merged nodes (e.g., ([$p_1$], [$p_2$])) if and only if some node contained in the first merged node in the pair is a parent of some node contained in the second merged node in the pair (i.e., if $p_1$=parent($p_2$)). In the example of FIG. 3, a merged node 302 is provided as a merger of the root nodes of each of the hierarchical schemas 200, 202, 204. As another example, a merged node 304 can be provided as a merger of the intermediate nodes 214, 218 of the hierarchical schema 200 (see FIG. 2A), an intermediate node 250 of the hierarchical schema 202 (see FIG. 2B), and an intermediate node 252 of the hierarchical schema 204 (see FIG. 2C). In some examples, one of the contained properties (p) labels the merged node. For example, in the example depicted in FIG. 3, the label "Customer" of the merged node 304 can be determined from the labels of the intermediate nodes 214, 218, 250, 252. In some examples, linguistic processes can be implemented to generate labels for the merged nodes.

In some implementations, a merged graph is provided as a cyclic graph. Consequently, the merged graph can include unacceptable cycles. The example merged graph 300 of FIG. 3 is a cyclic graph that includes cycles. Considering merged nodes 304, 306, 308, 310, 312 of FIG. 3, an example cycle is provided as Telecom→Customer→Telecom→Seller→Address→City, which, although each pair of path components is provided in the hierarchical schema, is not intuitive. In some examples, unintuitive cycles can occur if an equivalence class groups information of different granularities. For example, Seller in the path PO→Seller from the hierarchical schema 204 groups seller address and telecom information, whereas Seller in PO→Telecom→Seller from the hierarchical schema 200 only bundles telecom information. In some examples, unintuitive cycles can occur if an equivalence class groups information from different branches of the same schema. For example, address nodes 246, 260 in the hierarchical schema 204 (see FIG. 2C) bundle address information. Because the address nodes 246, 260 are merged into the single address node 310 of the merged graph 300, buyer and seller paths cannot be correctly distinguished.

To remove cycles, equivalence classes (i.e., merged nodes) can be split into a set of merged nodes by removing problematic tuples. Using the notation provided above, a problematic tuple ($p_1$, $p_2$) can be removed from an equivalence class E. To achieve this, only two properties $p_1$ and $p_2$ are accepted in a single merged node if all leaves reached from one property (e.g., $L_1=\{l_1 \epsilon L | (l_1, p_1) \epsilon parent^T\}$), whose corresponding leaves also exist in the schema of the second property (e.g., $L_2=\{l_2 | l_2 \sim_E l_1 \wedge l_1 \epsilon L \wedge [l_2]_s=[p_2]_s\}$), are also reached from the second property (e.g., $\forall l_2 \epsilon L_2 : (L_2, p_2) \epsilon parent^T$).

In some examples, an equivalence class can be provided as a complete, undirected graph. Every edge of the equivalence class can represent simultaneously a forward and a backward edge. The equivalence class is denoted by $G=(V, \epsilon)$, where each element of the equivalence class is a node (i.e., $V=[p_1]_E$). As every element corresponds to every other element in the equivalence class, the corresponding graph is complete. That means, the graph contains an edge $\epsilon$ between every pair of nodes (i.e., $\epsilon=[p_1]_E \times [p_1]_E$). Edges between unacceptable pairs of properties are removed to provide a reduced graph, where a clique of a reduced graph can be provided as a complete sub-graph. In some examples, a clique is maximal, if and only if, there is no larger clique having the same nodes. The maximal cliques of the reduced graph each includes nodes that can be merged without creating a conflict. Consequently, each maximal clique is provided as a merged node.

Figure 4A:
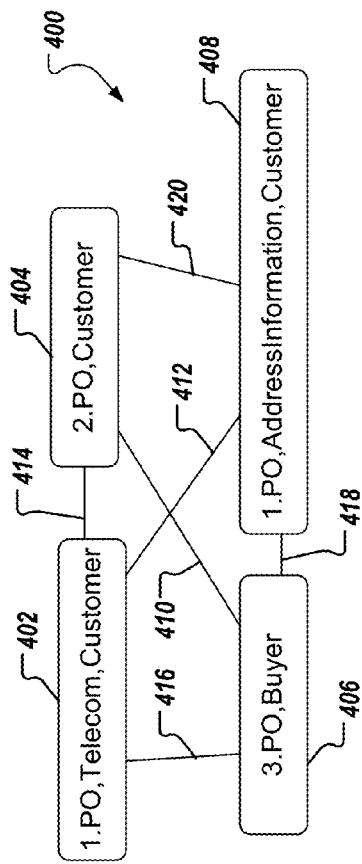
FIGS. 4A and 4B depicts example splitting of an equivalence class.
Figure 4B:
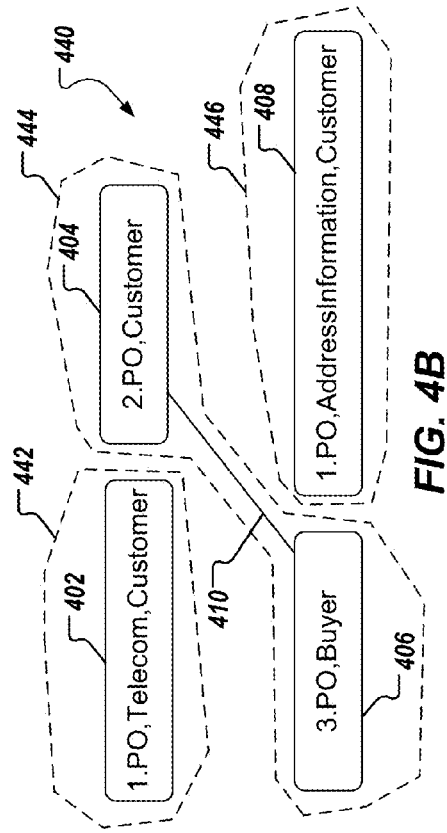

FIGS. 4A and 4B depicts example splitting of an equivalence class. FIG. 4A depicts an example graph 400 representing an example equivalence class that corresponds to the merged node 304 of FIG. 3. In the example graph 400, nodes 402, 404, 406, 408 and edges 410, 412, 414, 416, 418, 420 are provided. The nodes 402, 408 correspond to the intermediate nodes 214, 218 of the hierarchical schema 200 of FIG. 2A, the node 404 corresponds to the intermediate node 250 of the hierarchical schema 202 of FIG. 2B, and the node 406 corresponds to the intermediate node 252 of the hierarchical schema 204 of FIG. 2C. The graph 400 is complete because an edge exists between every pair of nodes. Edges between problematic pairs of nodes are removed to provide a reduced graph 440, depicted in FIG. 4B. The reduced graph 440 includes maximal cliques 442, 444, 446, each maximal clique representing a merged node. In the depicted example, the maximal clique 442 includes only the node 402, the maximal clique 444 includes the nodes 404, 406 and the edge 410, and the maximal clique 446 includes only the node 408.

In some implementations, computing the merged nodes from an equivalence class (i.e., splitting an equivalence class that has problematic tuples). Example pseudo-code for computing the merged nodes can be provided as:

```
ε = [p]_E × [p]_E
G = ([p]_E, ε)
For every p_1 ∈ [p]_E do:
    For every p_2 ∈ [p]_E \ {p_1} do:
        // find leaves reached by p_1
        For every l_1 = {l_1 ∈ L |(l_1,p_1) ∈ parent^T] do:
            // determine corresponding leaves in other schema
            For every l_2 ∈ [p_2]_s ∩ [l_1]_E do:
                // check whether the leaf is reached by p_2
                If (l_2,p_2) ∉ parent^T then:
                    Assert (p_1,p_2) ∉ ε and implicitly (p_2,p_1) ∉ ε
Return maximalCliques(G)
```

As a prerequisite, a transitive relation $parent^T$ is relied on and can be obtained from the function parent, discussed above. The example pseudo-code starts from the complete graph (i.e., $G=([p]_E, [p]_E \times [p]_E)$), and iterates over all pairs of properties checking the granularity requirement. In each iteration, conflicting edges are removed from the graph. When all conflicting edges are removed, the merged nodes (i.e., maximal cliques) are computed from the graph.

Figure 5:
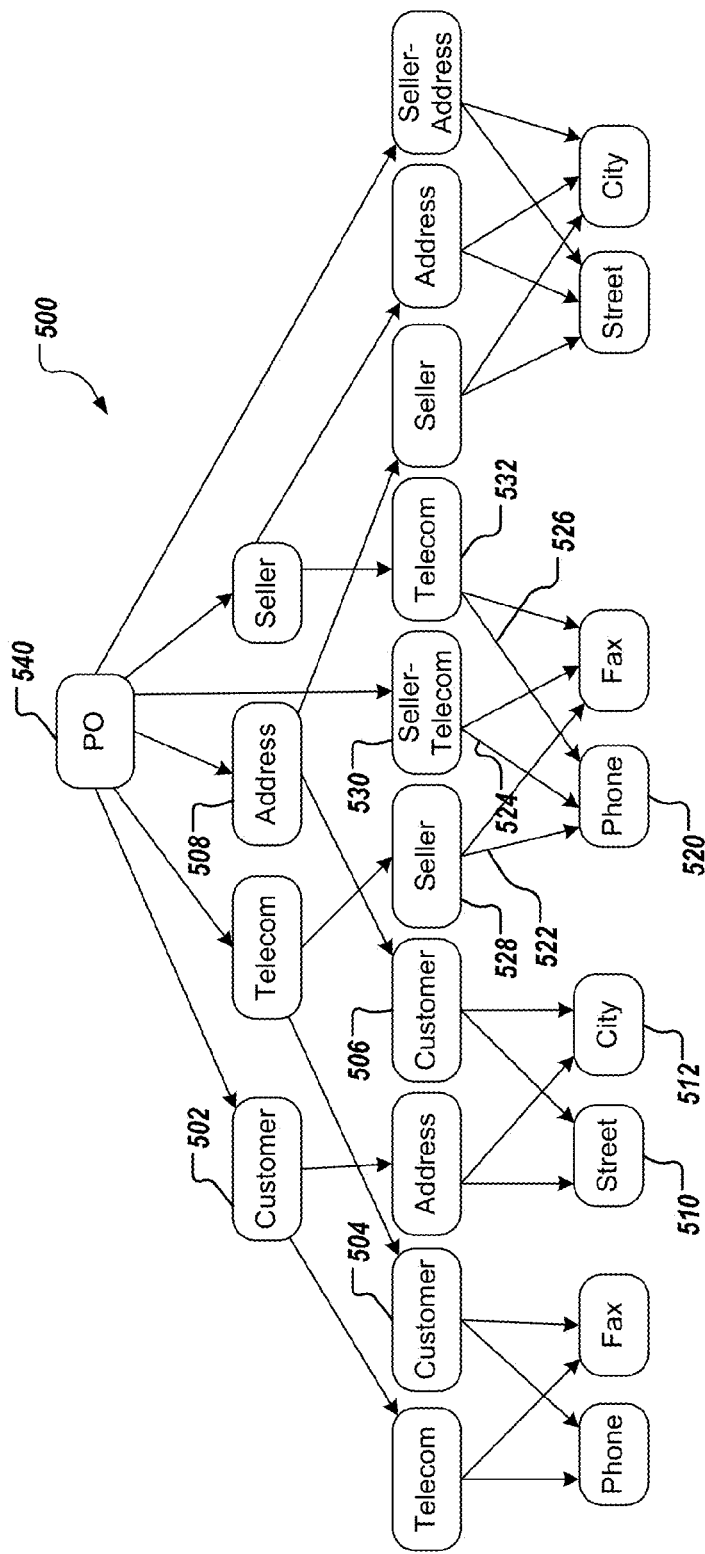
FIG. 5 depicts an example conflict-free merged graph.

FIG. 5 depicts an example conflict-free merged graph 500. The conflict-free merged graph 500 corresponds to the merged graph 300 of FIG. 3, where merged nodes having problematic tuples have been split. In some examples, the conflict-free merged graph 500 is provided as an acyclic graph. As a consequence of splitting, original equivalence classes appear multiple times. In this manner, alternative structures are provided, while excluding unintuitive structures. In some examples, the same label is kept for all merged nodes that result from one equivalence class to provide for harmonic labeling in schemas generated from the conflict-free merged graph. In the example of FIG. 5, and with reference to FIG. 4B, the intermediate node 502 corresponds to the maximal clique 444 (i.e., the merger of nodes 404, 406), the intermediate node 504 corresponds to the maximal clique 442 (i.e., the single node 402), and the intermediate node 506 corresponds to the maximal clique 446 (i.e., the single node 408).

The conflict-free merged graph can be processed to generate one or more MHSs. As noted above, the conflict-free merged graph describes alternative structures, while excluding unintuitive structures. Some alternative structures can be interdependent. By way of non-limiting example, and with reference to FIG. 5, the node 502 (PO/Customer) cannot be in the same structure as a node 508 (PO/Address), because both of the nodes 502, 508 are grandparent nodes (i.e., parents of parents) with respect to leaf nodes 510, 512 (i.e., customer street and city fields, respectively).

To handle such interdependencies, a constraints satisfaction problem (CSP) can be provided, which can be solved using CSP problem solving that combines heuristics and combinatorial search. In some examples, a CSP consists of variables and constraints. Each variable has a finite domain, and each constraint describes the dependencies between values of particular variables. In accordance with implementations of the present disclosure, one variable ($px_1$) is used per merged node, indicating the desired parent, where $X_1$ is the set of properties in the merged node. The domain of $px_1$ contains every merged node that contains any transitive parent of $X_1$, and can be denoted as:

$$Dom(px_1)=\{\sigma\}\cup\{X_2|X_2 \ni p \land p=\text{parent}^T(x_1) \land x_1 \in X_1\}$$

where σ is a special value that is defined as σ∉P, and that indicates omission of a node any parental edge of that node. σ is added only to the domain of internal merged nodes. Further, transitive parents are used to generate MHSs that omit less frequently used structures.

Each solution to the CSP can be provided as an MHS. Each MHS can include a tree structure in view of the archetype of the conflict-free merged graph extended by the transitive edges with some edges and nodes removed. In some examples, a MHS is not bound to the exact structures of one source hierarchical schema (e.g., the hierarchical schemas 200, 202, 204 of FIGS. 2A-2C), and can instead mix features of the source hierarchical schemas.

To generate an MHS from the conflict-free merged graph, edges and nodes of the conflict-free merged graph are removed. An example set of constraints defines the removal of exclusive edges, where leaf nodes of the conflict-free merged graph determine exclusivity. All edges in a set of edges (e.g., $\{e_1, e_2, \ldots\}$, where $e_1=(X_1, X_2)$, $e_2=(X_1, X_3), \ldots$, and $X_2 \neq X_3 \neq \ldots$) that potentially reach the same leaf node are exclusive. By way of non-limiting example, and with reference to FIG. 5, a leaf node 520 can be considered, which includes inbound edges 522, 524, 526 from intermediate nodes 528, 530, 532, respectively. The edge 540-502 is exclusive from the edge 540-508 because both 502 and 508 eventually reach leaf 510. Exclusive edges can be identified by iterating over every merged node and every merged leaf node, while consulting the previously calculated transitive relation $parent^T$. The following example pseudo-code can be provided:

For every merged node $X_1$ do:
    For every leaf equivalence class $[l_1]_E \in L/\sim_E$ assert:
        $\{X_2|x_2 \in X_2 \land l_2 \in [l_1]_E \land (l_2,x_2) \in \text{parent}^T \land \text{parent}(x_2) \in X_1\}$
        are exclusive.

In some examples, being exclusive means that only one of the edges may appear in an MHS. Consequently, for each computed set of exclusive children of $X_1$ (i.e., $\{X_{2,1}, X_{2,2}, \ldots\}$), a maximum occurrence constraint is added to the CSP. In some examples, the maximum occurrence constraint, indicates that a child node can have only one parent node (i.e., each child node can have only one inbound edge). The maximum occurrence constraint can be evaluated as $|\{i \in (X_{2,1}, X_{2,2}, \ldots) \cdot |p_i = X_1\}| \leq 1$, where i is an index used to evaluate the maximum occurrence constraint in view of the set of nodes $(X_{2,1}, X_{2,2}, \ldots)$.

In some implementations, other sets of constraints can be provided and can define the connectivity of the MHS tree structure to ensure that full paths are preserved. In some examples, a set of constraints can be provided to propagate edges, implicitly propagating node usage. For example, for every edge (i.e., connecting merged nodes $(X_1, X_2)$), a constraint can be added to the CSP. In some examples, the constraint can be denoted as $(\exists X_2: p_{x_2}=X_1) \leftrightarrow p_{x_1} \neq \sigma$. In some examples, a set of constraints can ensure that no adjacent edges are kept for an unused node. That is, a merged node (e.g., $X_1$) has no parent node if and only if no edge (i.e., connecting merged nodes $(X_1, X_2)$) is kept. Accordingly, the constraint that, for every unused node, edges should be removed, can be added to the CSP. In some examples, the constraint can be denoted as $(\nexists X_2: p_{x_1}=X_1) \leftrightarrow p_{x_1}=\sigma$ for every edge $(X_1, X_2)$.

The exclusivity and connectivity constraints jointly fulfill the rationale to construct intuitive MHSs. Accordingly, if an MHS contains a specific structure, the structure should be used completely. Therefore, if a merged node appears in the MHS, appropriate edges also appear in the MHS. In this manner, all potentially reachable leaf nodes are actually reached by the merged node and vice versa.

Figures 6A, 6B:
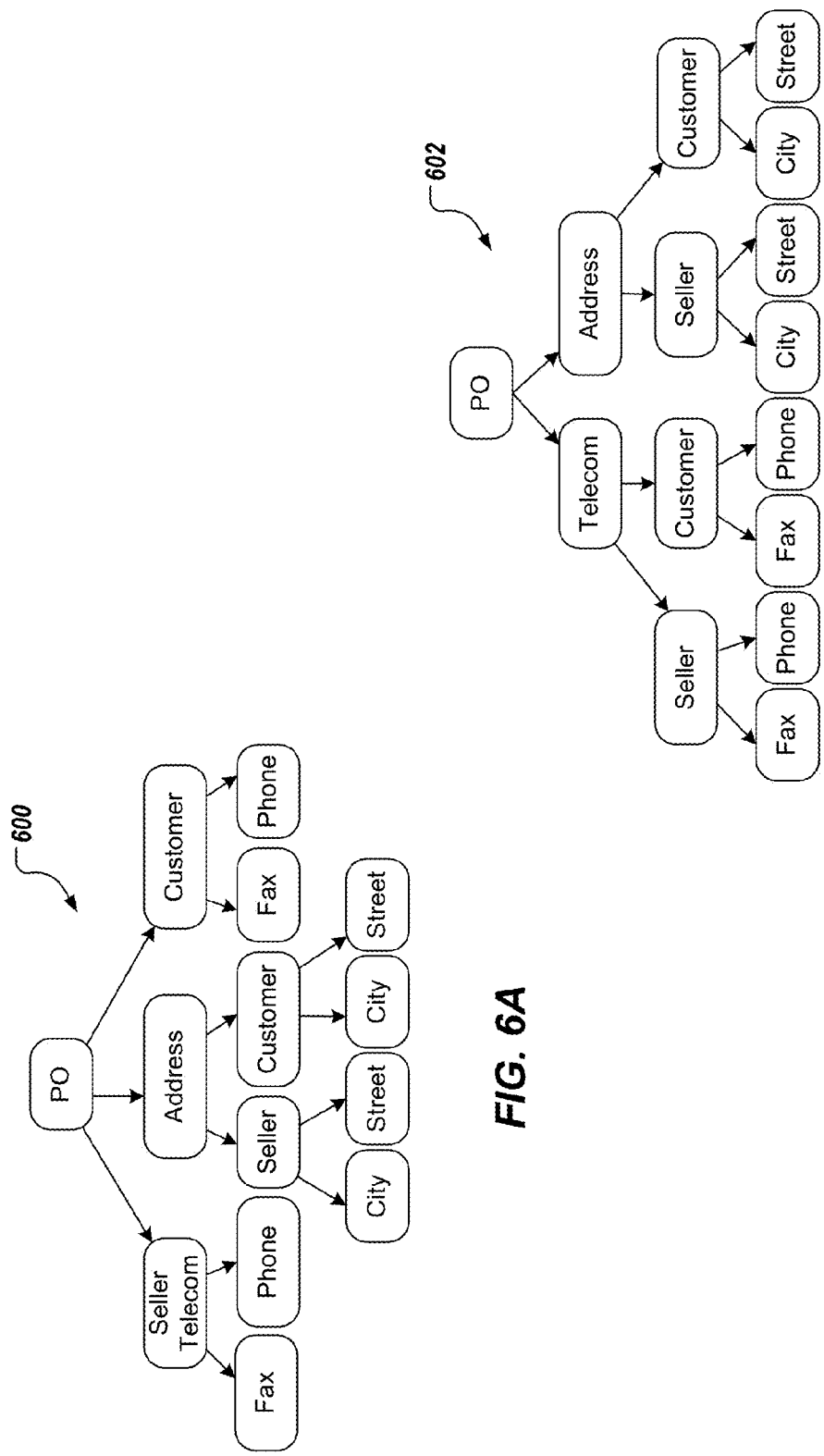
FIGS. 6A and 6B depict example mediated hierarchical schemas (MHSs).

FIGS. 6A and 6B depict example MHSs 600, 602, respectively. Each of the MHSs 600, 602 is provided as a solution to the CSP that is generated in view of the conflict-free merged graph 500 of FIG. 5. That is, each MHS 600, 602 is consistent with the structure of the conflict-free merged graph and is allowed by the constraints set forth in the CSP.

The CHS is determined based on the MHSs. In some implementations, a set of MHSs is provided and includes a plurality of MHSs. The CHS is provided as an optimal MHS of the set of MHSs. In some examples, optimality can be defined based on the amount of structural commonalities with the source hierarchical schemas. To quantify this, how frequently the properties in a merged node are used in practice can be determined. For that purpose, the field mappings in which each property is referenced can be counted. Counting can start from the uses of a leaf node of the conflict-free merged graph, where uses of a leaf node $l_1$ can be denoted as:

$$uses(l_1) = |\{l_1 | (l_1, l_2) \in M \vee (l_3, l_1) \in M\}|$$

Counting can continue using the internal properties p of the conflict-free merged graph MHS. An internal property of a schema is used as often as all reachable leaf nodes together, and can be denoted as:

$$uses(p) = \Sigma_{l \in L \wedge (l,p) \in parent^T} uses(l)$$

In some examples, internal property usages can be aggregated for each merged node of the conflict-free merged graph. Aggregation of the usages can be denoted as:

$$uses(X) \Sigma_{p \in X} uses(p)$$

In this manner, how often each merged node is referenced in all mappings can be determined.

In some implementations, scaling is provided to compare the relative importance of different merged nodes. In some examples, the number of absolute uses of a merged node (i.e., uses(X)) is compared to a maximum possible number of uses, which can be provided as:

$$maxUses(X) = \Sigma_{x \in X} \wedge_{(l_2, x) \in parent^T} \wedge_{l_1 \in L \wedge l_1 - El_2} uses(l_2)$$

For example, a merged node could have potentially been used in all the mappings in which the equivalents of the reachable leaves are involved.

A use frequency can be determined for each merged node in the conflict-free merged graph. In some examples, the frequency is provided as a normed use based on the following example relationship:

$$freq(X) = \frac{uses(X)}{maxUses(X)}$$

By way of non-limiting example, and with reference to a sub-set of merged nodes provided in FIG. 5, the actual uses, potential uses (maximum possible uses) and the frequency for the root node can be provided as 64, 64 and 100%, respectively, can be provided as 8, 16 and 50%, respectively, for the intermediate node 506, can be provided as 8, 16 and 50%, respectively, for the intermediate node 528, and can be provided as 4, 16 and 25%, respectively, for the intermediate node 530. It is appreciated that a frequency can be provided for each of the intermediate nodes and the root node in the conflict-free merged graph.

In some implementations, a CHS maximizes the sum of merged node frequencies, while some nodes may be removed. Node removal may be due to exclusivity with a more frequent alternative or due to infrequency of the node itself. To cater for infrequency of a node itself, the frequency of a merged node below a threshold $\theta$, for example $\theta = 50\%$, is not considered and is instead counted as 0%. A relevant frequency for each merged node can be provided as:

$$rfreq(X) = \begin{cases} freq(X), & freq(X) \geq \theta \\ 0, & \text{otherwise} \end{cases}$$

In accordance with the present disclosure, the CSP is provided as an optimization problem by a floating point variable (m) to be maximized. In some examples, the value of m is calculated for each MHS as the sum of the relevant frequencies of the merged nodes that are kept (i.e., from the conflict-free merged graph) in the particular MHS. An indicative variable ($h_x$) can be provided with domain (0.1) for each merged node X. The indicative variable keeps track of whether a node is used. Accordingly, the value is calculated by the constraints $p_x \neq \sigma \leftrightarrow h_x = 1$ and $p_x = \sigma \leftrightarrow h_x = 0$. The constraint for the optimization variable computing the average usage can be provided using the following example relationship:

$$m = \frac{\sum_X \hat{k}_x \, rfreq(X)}{|\{X \mid \hat{k}_x = 1\}|}$$

The optimal solution of the CSP is a MHS that may contain infrequent merged nodes. Removing the infrequent nodes and joining the dangling edges results in the CHS containing only the most common structure of the given hierarchical schemas. With reference to FIGS. 6A and 6B, the MHS 602 of FIG. 6B can be determined to be the optimal solution to the CSP based on the conflict-free merged graph 500 of FIG. 5.

Figure 7:
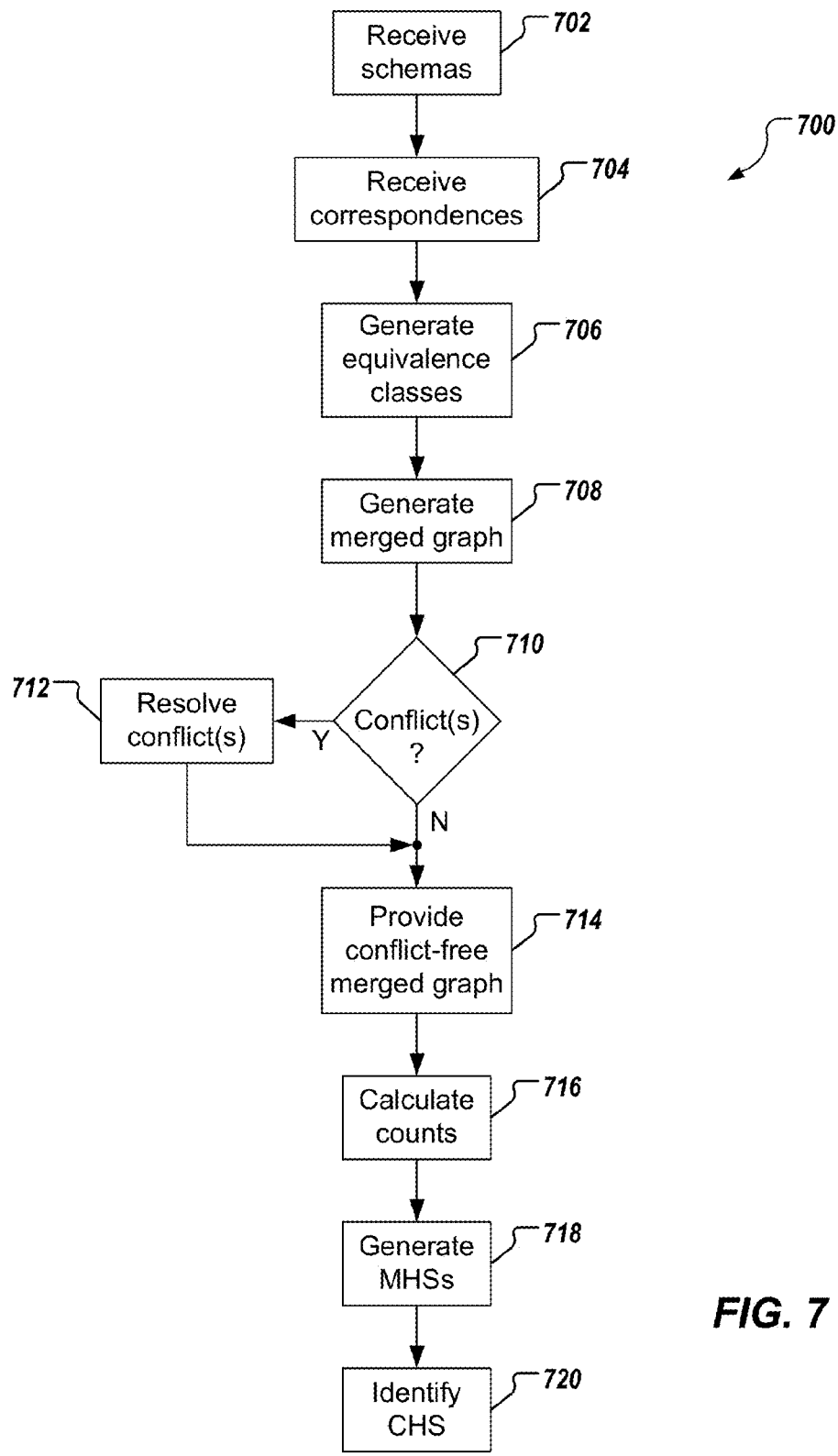
FIG. 7 depicts an example process that can be executed in implementations of the present disclosure.

Referring now to FIG. 7, an example process 700 can be executed in implementations of the present disclosure. In some examples, the process 700 can be provided in one or more computer programs executed using one or more computing devices.

A plurality of hierarchical schemas is received (702). In some examples, each hierarchical schema can be provided as an electronic document that is received from computer-readable memory. In some examples, each hierarchical schema can be deemed to be a source hierarchical schema. A plurality of field mappings and semantic correspondences are received (704). In some examples, each hierarchical schema can be provided as an electronic document that is received from computer-readable memory. In some example, each field mapping defines two-way correspondences between leaf nodes of a plurality of the hierarchical schemas. In some example, each semantic correspondence defines two-way correspondences between intermediate nodes of a plurality of the hierarchical schemas.

Equivalence classes are generated (706). In some examples, and as discussed in detail above, each equivalence class can include one or more nodes of each of the hierarchical schemas, which one or more nodes can define a merged node. A merged graph is generated. In some examples, and as discussed in detail above, the merged graph includes the equivalence classes provided as merged nodes and edges between the merged nodes. It is determined whether one or more conflicts exist in the merged graph (710). In some examples, a conflict exists if an equivalence class (i.e., a merged node) includes problematic tuples.

If it is determined that one or more conflicts exist in the merged graph, the conflicts are resolved (712), and a conflict-free merged graph is provided (714). In some examples, and as discussed in detail above, a conflict is resolved by splitting of an equivalence class into a plurality of merged nodes, each merged node defining a maximal clique. If it is determined that conflicts do not exist in the merged graph, the conflict-free merged graph is provided (714). Counts for each merged node are determined (716). More specifically, the counts can include the actual uses, potential uses, the frequency and the relevant frequency. As discussed above, the actual uses, potential uses, the frequency and the relevant frequency can be determined for each non-leaf merged node of the conflict-free merged graph. In some examples, the actual uses, potential uses, the frequency and the relevant frequency are determined based on the provided field mappings and semantic correspondences. In some examples, a floating point variable is determined for each MHS, and the MHS having the highest value for the floating point variable is identified as the optimum MHS and, thus, the CHS. In some example, the floating point variable is determined based on the counts for the non-leaf nodes provided in each MHS, the counts being provided from the conflict-free merged graph.

Multiple MHSs are generated (718). In some examples, and as discussed above, a CSP is generated and constraints for the CSP are defined. Each MHS is generated as a potential solution to the CSP. In some examples, each MHS is generated by removing unused nodes and exclusive edges from the conflict-free merged graph based on the constraints. A CHS is identified (720). For example, and as discussed in detail above, the CHS is selected as one of the multiple MHSs. In some examples, the optimum MHS is identified and the CHS is provided as the optimum CHS.

For business intelligence, instance data from different computing systems inside one company have to be analyzed at once. The different computing systems store their data in different schemas. Computing the overarching schema (CHS) is a prerequisite to provide a unified list of the instances from all systems to be analyzed at once.

Figure 8:
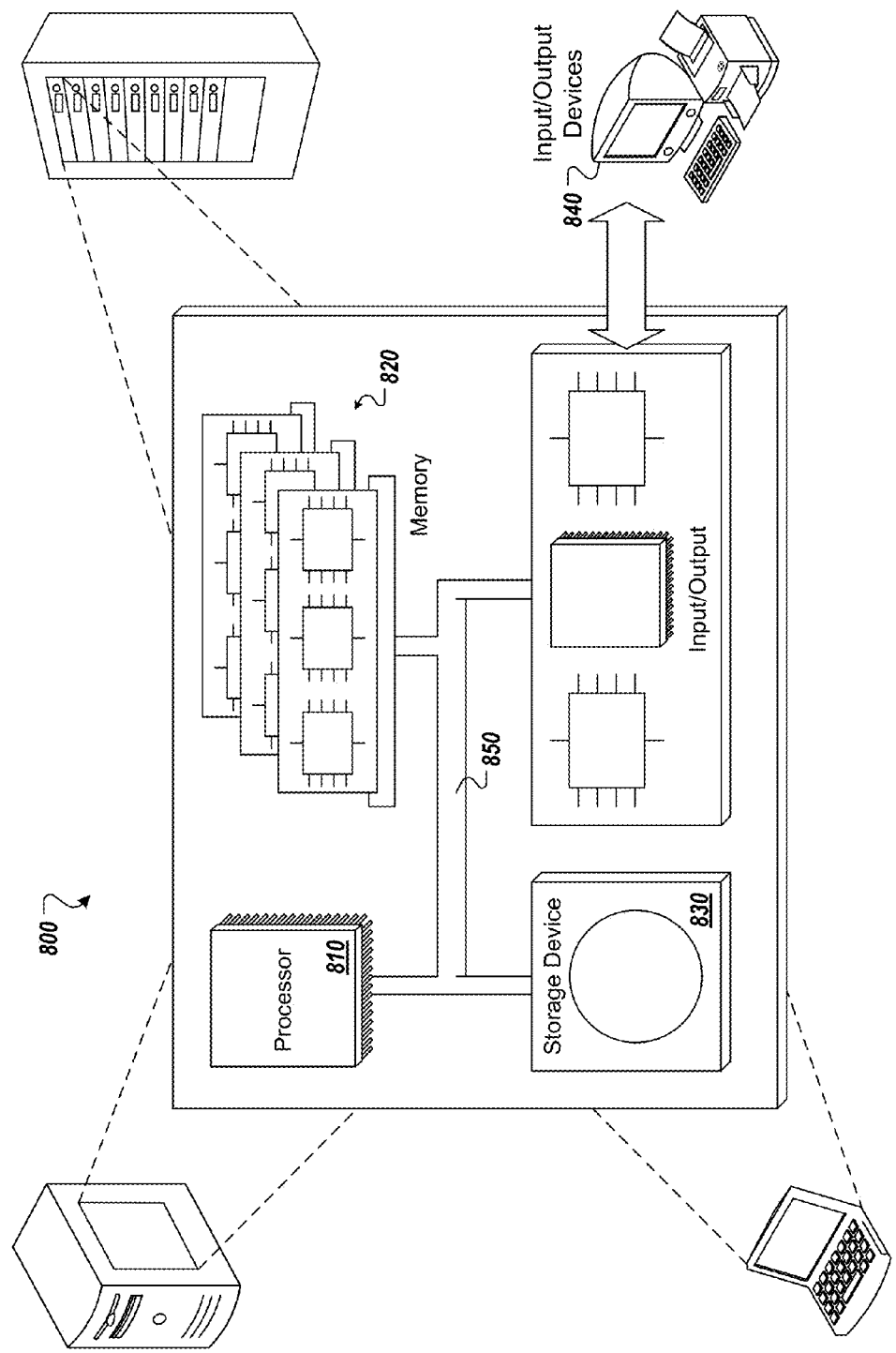
FIG. 8 is a schematic illustration of example computer systems that can be used to execute implementations of the present disclosure.

Referring now to FIG. 8, a schematic diagram of an example computing system 800 is provided. The system 800 can be used for the operations described in association with the implementations described herein. For example, the system 800 may be included in any or all of the server components discussed herein. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit. The storage device 830 is capable of providing mass storage for the system 800. In one implementation, the storage device 830 is a computer-readable medium. In various different implementations, the storage device 830 may be a floppy disk device, a hard disk device, an optical disk device, or a tape device. The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method of providing a canonical hierarchical schema (CHS) based on a plurality of source hierarchical schemas, the method being executed using one or more processors and comprising:
   receiving the plurality of source hierarchical schemas, each source hierarchical schema being stored as a computer-readable document in computer-readable memory;
   processing, using the one or more processors, the source hierarchical schemas to generate a merged graph, the merged graph comprising a plurality of merged nodes, each merged node being provided based on one or more nodes from at least two of the source hierarchical schemas;
   determining, using the one or more processors, that the merged graph includes one or more conflicts and, in response, resolving each conflict of the one or more conflicts to generate a conflict-free merged graph, wherein resolving comprises splitting one or more merged nodes into respective sub-sets of merged nodes;
   defining a constraints satisfaction problem (CSP) that includes a plurality of constraints associated therewith based on the conflict-free merged graph;
   processing, using the one or more processors, the CSP to generate a plurality of mediated hierarchical schemas (MHSs), each MHS being a solution to the CSP;
   identifying an MHS of the plurality of MHSs as an optimum MHS, wherein the CHS is provided as the optimum MHS; and
   storing the CHS as a computer-readable document in the computer-readable memory.

2. The method of claim 1, further comprising receiving a plurality of field mappings and a plurality of semantic correspondences, each field mapping and semantic correspondence being associated with a set of source hierarchical schemas, wherein the merged graph is generated based on the plurality of field mappings and the plurality of semantic correspondences.

3. The method of claim 1, wherein splitting the one or more merged nodes into respective sub-sets of merged nodes comprises, for each merged node of the one or more merged nodes, generating a reduced graph comprising a plurality of maximal cliques.

4. The method of claim 3, wherein each maximal clique includes nodes that can be merged without creating a conflict.

5. The method of claim 1, wherein the plurality of constraints define the removal of exclusive edges from the conflict-free merged graph to provide an MHS, exclusive edges being identified based on leaf nodes of the conflict-free merged graph.

6. The method of claim 5, wherein the plurality of constraints comprise a maximum occurrence constraint, the maximum occurrence constraint providing that a child node can have only one parent node.

7. The method of claim 5, wherein the plurality of constraints comprise a maximum occurrence constraint, the maximum occurrence constraint providing that edges that eventually reach the same leaf are exclusive.

8. The method of claim 1, wherein the plurality of constraints comprise at least one connectivity constraint that ensures that full paths provided in the hierarchical schemas are preserved in the plurality of MHSs.

9. The method of claim 1, further comprising, for each non-leaf merged node of the conflict-free merged graph:
   determining a number of actual uses;
   determining a number of potential uses;
   determining a frequency based on the number of actual uses and the number of potential uses; and
   determining a relevant frequency based on the frequency.

10. The method of claim 9, wherein the number of actual uses and the number of potential uses are determined based on a plurality of field mappings, each field mapping being associated with a set of source hierarchical schemas.

11. The method of claim 9, wherein the relevant frequency is determined based on a frequency threshold.

12. The method of claim 1, further comprising, for each MHS of the plurality of MHSs, determining a floating point variable to provide a plurality of floating point variables.

13. The method of claim 11, wherein the floating point variable is provided as a sum of relevant frequencies associated with each merged node that is present in the MHS.

14. The method of claim 11, wherein identifying an MHS of the plurality of MHSs as an optimum MHS comprises identifying a maximum floating point variable from the plurality of floating point variables, the optimum MHS being having the maximum floating point variable.

15. The method of claim 1, wherein the merged graph is a cyclic graph.

16. The method of claim 1, wherein the conflict-free merged graph is an acyclic graph.

17. The method of claim 1, wherein the conflict-free merged graph includes a non-tree structure.

18. The method of claim 1, wherein each MHS includes a tree structure.

19. A non-transitory computer-readable storage medium coupled to one or more processors and having instructions stored thereon which, when executed by the one or more processors, cause the one or more processors to perform operations for improving keyword searches, the operations comprising:
   receiving the plurality of source hierarchical schemas, each source hierarchical schema being stored as a computer-readable document;
   processing, using the one or more processors, the source hierarchical schemas to generate a merged graph, the merged graph comprising a plurality of merged nodes, each merged node being provided based on one or more nodes from at least two of the source hierarchical schemas;
   determining, using the one or more processors, that the merged graph includes one or more conflicts and, in response, resolving each conflict of the one or more conflicts to generate a conflict-free merged graph, wherein resolving comprises splitting one or more merged nodes into respective sub-sets of merged nodes;

defining a constraints satisfaction problem (CSP) that includes a plurality of constraints associated therewith based on the conflict-free merged graph;

processing, using the one or more processors, the CSP to generate a plurality of mediated hierarchical schemas (MHSs), each MHS being a solution to the CSP;

identifying an MHS of the plurality of MHSs as an optimum MHS, wherein the CHS is provided as the optimum MHS; and storing the CHS as a computer-readable document.

20. A system, comprising:

a computing device; and a computer-readable storage device coupled to the computing device and having instructions stored thereon which, when executed by the computing device, cause the computing device to perform operations for improving keyword searches for enterprise services, the operations comprising:

receiving the plurality of source hierarchical schemas, each source hierarchical schema being stored as a computer-readable document;

processing, using the one or more processors, the source hierarchical schemas to generate a merged graph, the merged graph comprising a plurality of merged nodes, each merged node being provided based on one or more nodes from at least two of the source hierarchical schemas;

determining, using the one or more processors, that the merged graph includes one or more conflicts and, in response, resolving each conflict of the one or more conflicts to generate a conflict-free merged graph, wherein resolving comprises splitting one or more merged nodes into respective sub-sets of merged nodes;

defining a constraints satisfaction problem (CSP) that includes a plurality of constraints associated therewith based on the conflict-free merged graph;

processing, using the one or more processors, the CSP to generate a plurality of mediated hierarchical schemas (MHSs), each MHS being a solution to the CSP;

identifying an MHS of the plurality of MHSs as an optimum MHS, wherein the CHS is provided as the optimum MHS; and storing the CHS as a computer-readable document.

* * * * *